(12) United States Patent
Medina Luna

(10) Patent No.: US 10,101,018 B2
(45) Date of Patent: Oct. 16, 2018

(54) DOME LIGHT ASSEMBLY WITH INTEGRAL REMOVABLE LAMP UNIT FOR USE IN EMERGENCIES

(71) Applicant: FORD GLOBAL TECHNOLOGIES, LLC, Dearborn, MI (US)

(72) Inventor: Maria Fernanda Medina Luna, Naucalpan (MX)

(73) Assignee: Ford Global Technologies, LLC, Dearborn, MI (US)

(*) Notice: Subject to any disclaimer, the term of this patent is extended or adjusted under 35 U.S.C. 154(b) by 247 days.

(21) Appl. No.: 14/861,389

(22) Filed: Sep. 22, 2015

(65) Prior Publication Data

US 2017/0080854 A1    Mar. 23, 2017

(51) Int. Cl.
| | | |
|---|---|---|
| *B60Q 1/00* | (2006.01) |
| *B60Q 3/00* | (2017.01) |
| *F21V 33/00* | (2006.01) |
| *F21S 9/02* | (2006.01) |
| *B60Q 3/51* | (2017.01) |
| *B60Q 3/59* | (2017.01) |
| *F21L 4/04* | (2006.01) |
| *B60Q 3/74* | (2017.01) |
| *B60Q 1/24* | (2006.01) |

(52) U.S. Cl.
CPC ............ *F21V 33/0052* (2013.01); *B60Q 3/51* (2017.02); *B60Q 3/59* (2017.02); *B60Q 3/74* (2017.02); *F21L 4/04* (2013.01); *F21S 9/022* (2013.01); *F21V 33/0084* (2013.01); *B60Q 1/24* (2013.01)

(58) Field of Classification Search
CPC ... F21V 33/0052; F21V 33/0084; B60Q 3/74; B60Q 3/59; B60Q 3/51; B60Q 1/24; F21L 4/04; F21S 9/022
USPC .......................................... 362/486, 549, 546
See application file for complete search history.

(56) References Cited

U.S. PATENT DOCUMENTS

| | | |
|---|---|---|
| 5,521,806 A | 5/1996 | Hutzel et al. |
| 5,984,495 A | 11/1999 | Roberts et al. |
| 6,286,976 B1 | 9/2001 | Chopra et al. |
| 6,398,394 B1 | 6/2002 | Winnik et al. |
| 7,300,189 B2 | 11/2007 | England et al. |
| 2006/0132382 A1* | 6/2006 | Jannard .................. G02C 11/06 345/8 |
| 2007/0133219 A1 | 6/2007 | Chaloult et al. |
| 2009/0233572 A1* | 9/2009 | Basir .................... H04M 3/5116 455/404.1 |

(Continued)

FOREIGN PATENT DOCUMENTS

| | | |
|---|---|---|
| EP | 2727770 A1 | 5/2014 |
| JP | H10278673 A | 10/1998 |

OTHER PUBLICATIONS

English machine translation of JPH10278673A, Oct. 20, 1998.

(Continued)

*Primary Examiner* — Karabi Guharay
*Assistant Examiner* — Glenn Zimmerman
(74) *Attorney, Agent, or Firm* — Vichit Chea; King & Schickli, PLLC

(57) ABSTRACT

A dome light assembly is provided for a motor vehicle. That dome light assembly includes a housing having a receiver. A removable lamp unit is releasably held in the receiver. The removable lamp unit includes an indicator for signaling an incoming telephone call.

13 Claims, 11 Drawing Sheets

(56) References Cited

U.S. PATENT DOCUMENTS

2014/0111948 A1\* 4/2014 Ma ............................ A45B 3/00
 361/729
2015/0049500 A1 2/2015 Sakarian et al.
2017/0066368 A1\* 3/2017 Miller ...................... B60Q 1/08

OTHER PUBLICATIONS

"XLamp XP-L High Intensity", Cree, Inc., www.cree.com/xlamp/hi?WT.mc_id=crx741, May 27, 2015.
"Innovative Applications for LEDs in Automobiles—LEDs", LEDs Magazine, http://www.ledsmagazine.com/articles/2006/08/innovativeapplicationsforledsnautomobiles.html, May 27, 2015.

\* cited by examiner

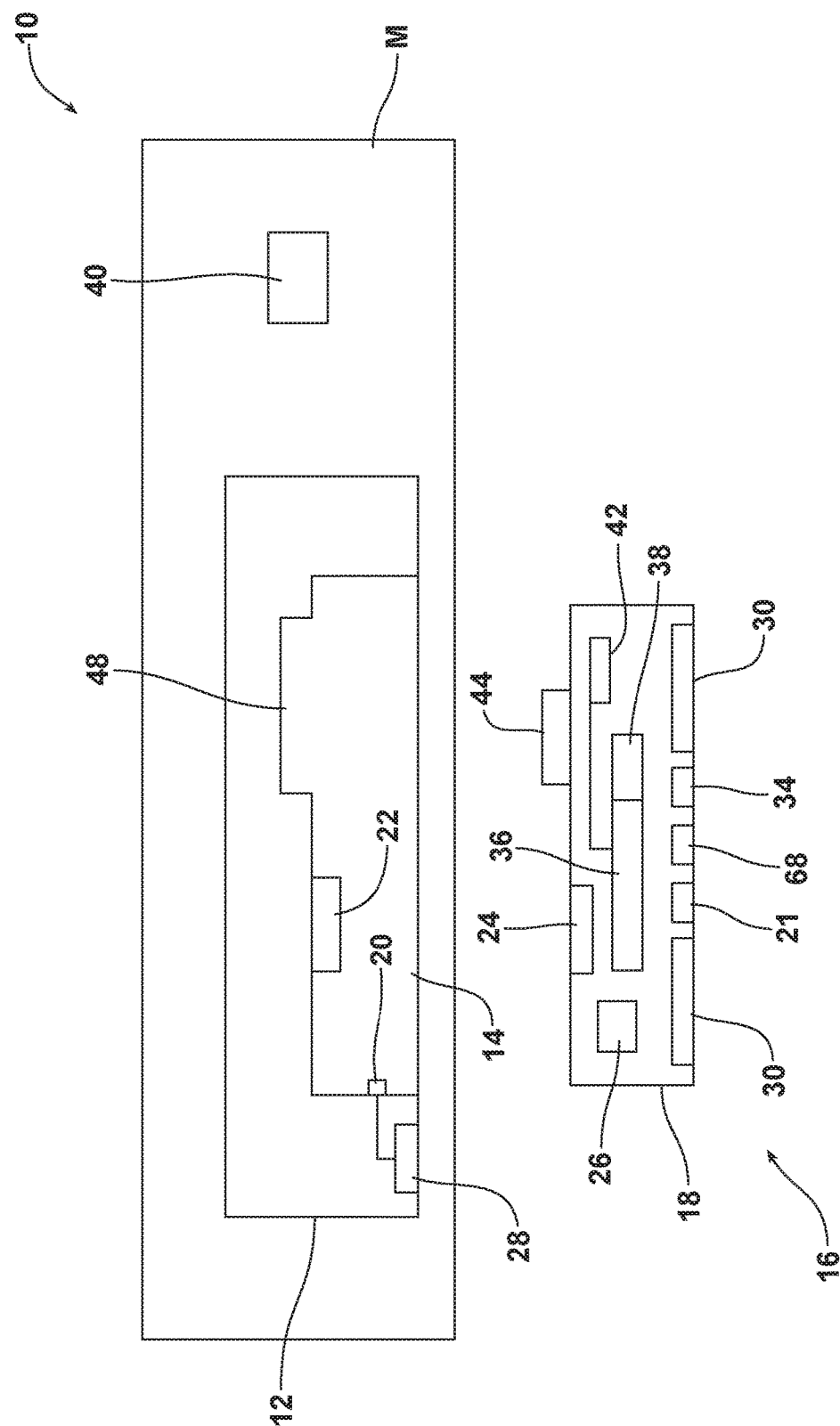

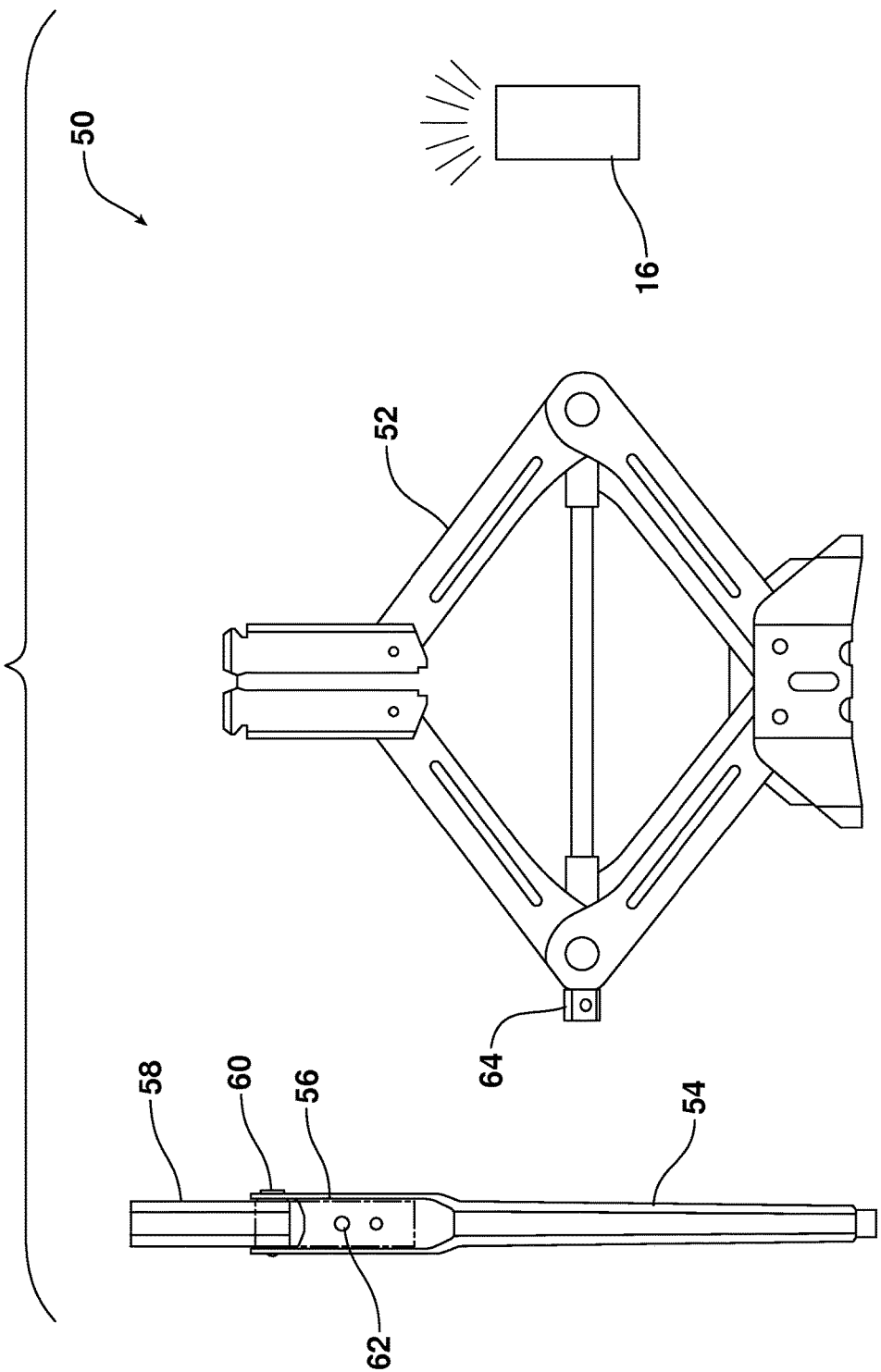

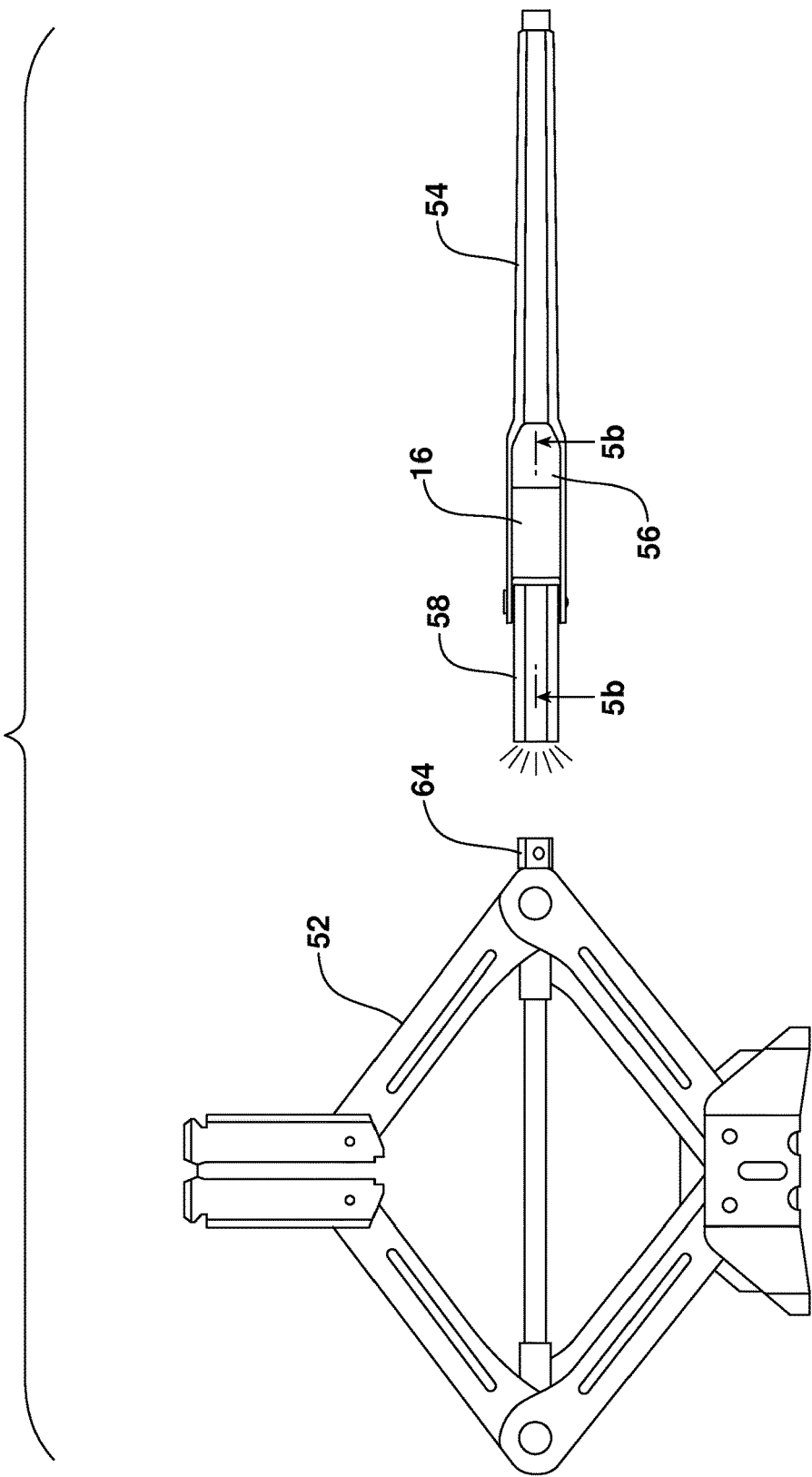

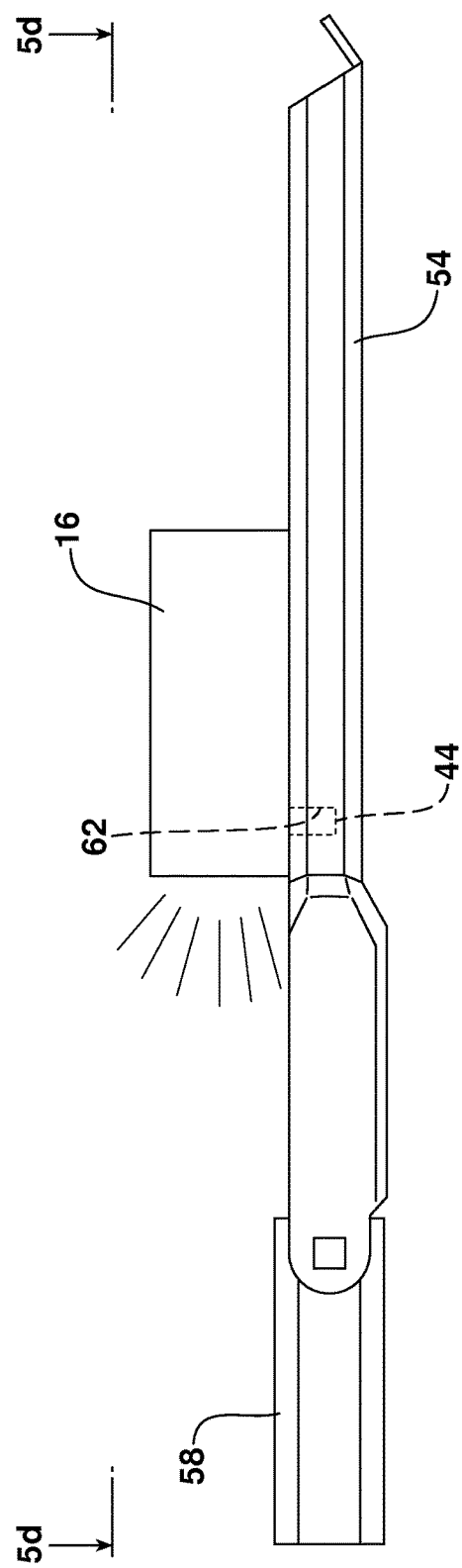

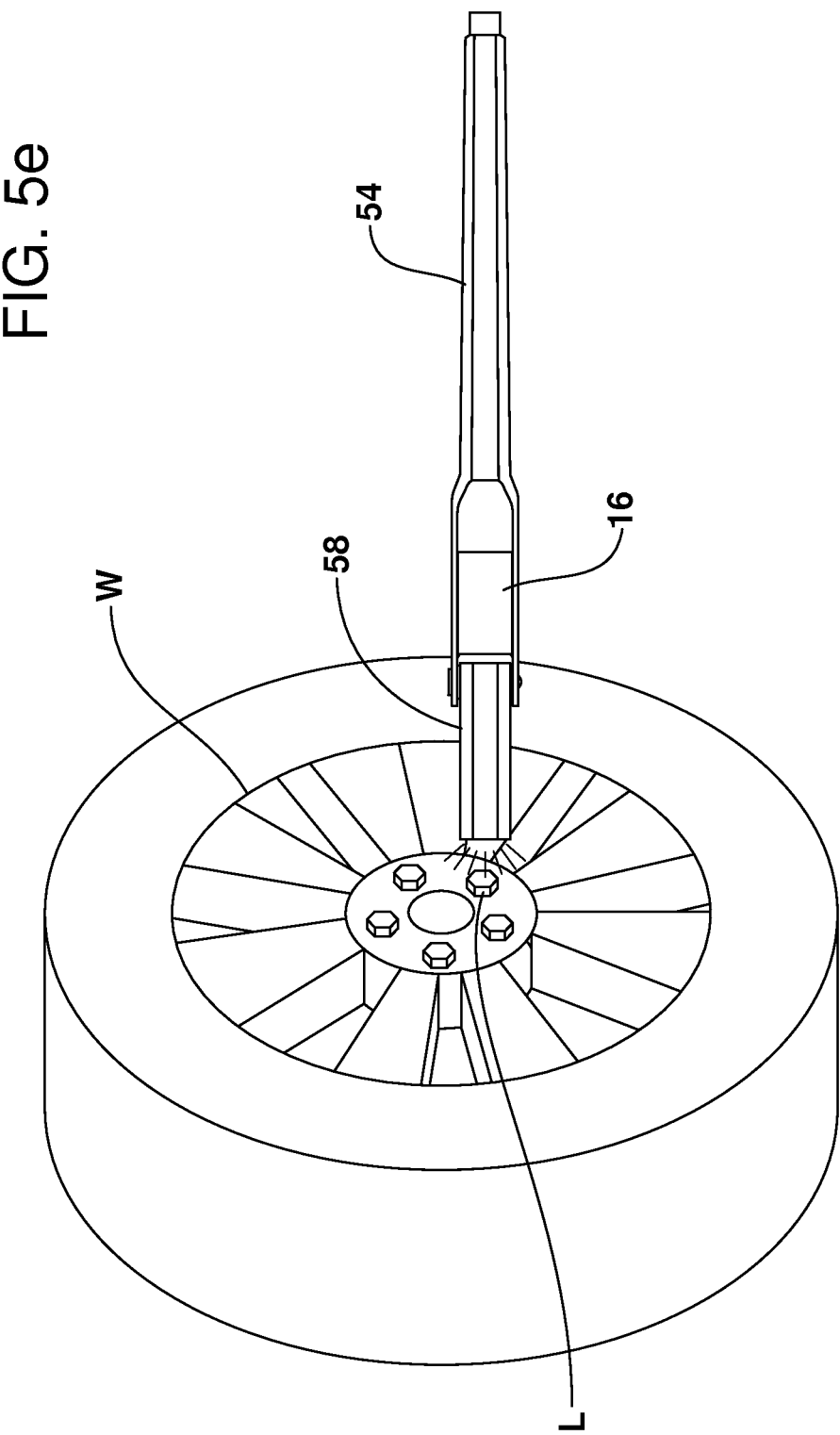

DOME LIGHT ASSEMBLY WITH INTEGRAL REMOVABLE LAMP UNIT FOR USE IN EMERGENCIES

TECHNICAL FIELD

This document relates generally to the motor vehicle equipment field and, more specifically, to a dome light assembly incorporating an integral and removable lamp unit that may be conveniently accessed and used by a vehicle operator in the event of an emergency.

BACKGROUND

While the concept of providing a dome light assembly with a removable, battery-powered emergency flashlight is old in the art, further and significant improvements to this concept are possible. For example, when a motor vehicle operator is in an emergency situation such as changing a tire or working on the engine of the motor vehicle under the motor vehicle hood, the operator will likely leave his or her cell phone inside the motor vehicle. Under such circumstances, it may not be possible to hear an incoming call on the cell phone, particularly if the roadway generates substantial traffic noise. This document relates to a new and improved dome light assembly incorporating a removable lamp unit that also has an indicator for signalling an incoming phone call.

SUMMARY

In accordance with the purposes and benefits described herein, a dome light assembly is provided for a motor vehicle. That dome light assembly comprises a housing including a receiver, a removable lamp unit releasably held in the receiver and an indicator for signaling an incoming phone call carried on the removable lamp unit. In one possible embodiment, that indicator is a vibrator. In another possible embodiment, that indicator is an audio generator. In yet another possible embodiment, that indicator is a flashing light.

In one possible embodiment, the dome light assembly further includes a mounting element carried on the removable lamp unit. Specifically, the mounting element is carried on a rear face of the removable unit so as to be hidden from view by the housing when the removable lamp unit is held in the receiver. In contrast, when the removable lamp unit is removed from the receiver, the mounting element is exposed and may be utilized to secure the removable lamp unit to a complementary mounting point provided on a jack handle of the motor vehicle. Thus, it should be appreciated that the removable lamp unit may be held on the jack handle in a position so as to light the work area when changing a tire on the motor vehicle. By lighting the work area, the removable lamp unit increases visibility of the immediate area, reducing the risk of a vehicle operator misplacing parts such as a lug nut and being forced to search for it around a potentially busy and hazardous roadside area.

In accordance with yet another aspect, the dome light assembly may further include an SOS roadside assistance call button in the removable lamp unit.

Still further, the dome light assembly may include a controller with a wireless communication component carried on the removable lamp unit to communicate wirelessly with a body control module of the motor vehicle when the removable lamp unit is removed from the housing. Still further, a rechargeable power source may be carried on the removable lamp unit to power the electrical components of the removable lamp unit when the removable lamp unit is removed from the housing. That housing may also include a charging cradle for charging the rechargeable power source when the removable lamp unit is held in a receiver of the housing. Further, the housing may include a latch for securing the removable lamp unit in the receiver and a button for releasing the latch to remove the removable lamp unit from the receiver.

In accordance with an additional aspect, an emergency lighting system is provided. That emergency lighting system comprises a jack including a jack handle and a light carried on the jack handle. In one possible embodiment, the light includes a mounting element and the jack handle includes a complementary mounting point for engagement with the mounting element. Still further, an indicator, carried on the jack handle, functions to signal an incoming phone call on the cell phone of the vehicle operator. That indicator may provide an audio signal and/or a visual signal.

In the following description, there are shown and described several preferred embodiments of the dome light assembly. As it should be realized, the dome light assembly is capable of other, different embodiments and its several details are capable of modification in various, obvious aspects all without departing from the dome light assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the dome light assembly and together with the description serve to explain certain principles thereof. In the drawing figures:

FIG. 3 is a block diagram of the dome light assembly illustrating the various components of that assembly including the electronic components that provide for its operation.

FIG. 4 is a side elevational view of the emergency lighting system including the light that is secured to the jack handle by means of a mounting element at a complementary mounting point.

FIGS. 5a-5e show various ways of securing the light to the jack handle and orienting the light to illuminate a work area.

Reference will now be made in detail to the present preferred embodiments of the dome light assembly, examples of which are illustrated in the accompanying drawing figures.

DETAILED DESCRIPTION

Figure 1:
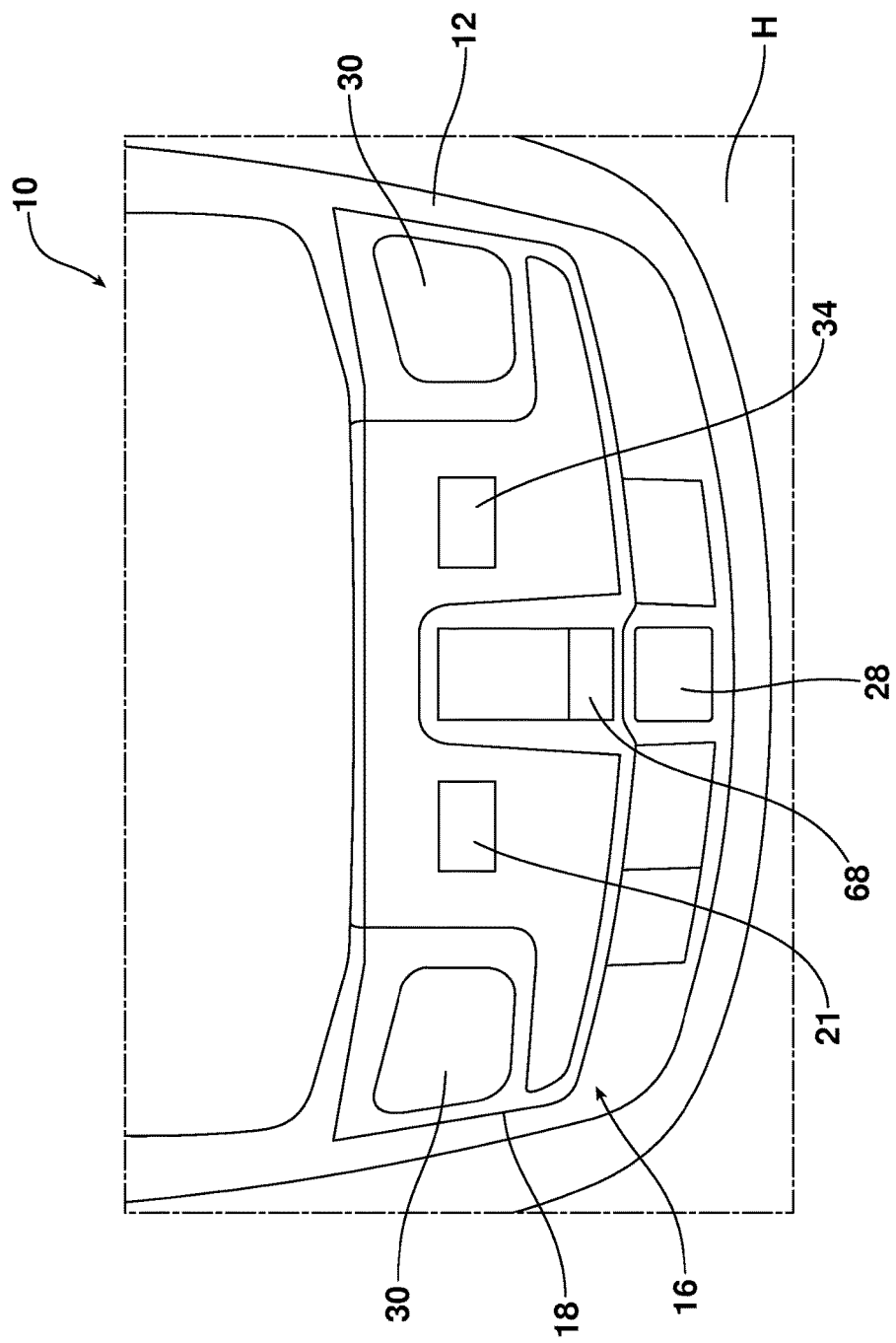
FIG. 1 is a bottom plan view of the dome light assembly illustrating the removable lamp unit received and held in the receiver of the dome light assembly housing.
Figure 2:
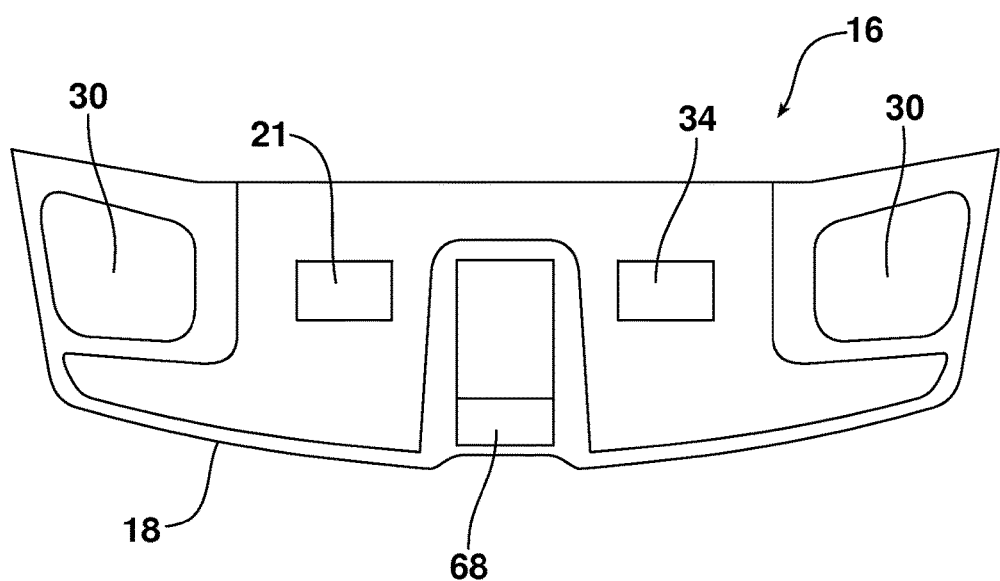
FIG. 2 is a detailed perspective view of the removable lamp assembly detached from the dome light housing.

Reference is now made to FIGS. 1-3, illustrating a first embodiment of the dome light assembly 10 that is the subject matter of this document. As illustrated, the dome light assembly 10 includes a housing 12 mounted on the inside of the motor vehicle adjacent to or on the head liner H. The housing 12 includes a receiver 14 to receive and hold a removable lamp unit 16.

In the illustrated embodiment, the receiver 14 comprises a recess that receives the outer housing 18 of the lamp unit 16. A latch 20 functions to secure the lamp unit 16 in the receiver 14. When the lamp unit 16 is properly seated in the receiver 14, a charging cradle 22 on the housing 12 is engaged with a charging connection 24 carried on the lamp unit 16 and electrically connected to the rechargeable power source 26 also carried on the lamp unit 16. That power source 26 powers the electrical components of the removable lamp unit 16 when the removable lamp unit is removed from the housing 12. A release button 28 on the housing 12 may be pressed to release the latch 20 in order to allow removal of the lamp unit 16 from receiver 14 in the housing 12.

The lamp unit 16 includes one or more lamps 30, such as light emitting diodes, that are powered by the rechargeable power source 26. An on-switch 21 allows one to turn on the lamps 30 while an off-switch 34 allows one to extinguish the lamps 30.

The lamp unit 16 also includes a controller 36 in the form of a computing device such as a dedicated microprocessor or electronic control unit (ECU) incorporating appropriate software control. The controller 36 comprises one or more processors, one or more memories and one or more network interfaces that communicate with each other over a communication bus. As illustrated, the controller 36 also includes a wireless communication component 38 that provides for wireless communication between the controller 36 and the body control module or BCM 40 of the motor vehicle M. The BCM 40 performs a number of interior body electrically-based functions including, for example, interior locking, remote key entry, interior light, exterior light, windshield wiper control and the like. The BCM 40 is also configured to control entertainment and communications functions including radio, CD player, telephone calls and Internet communications over a wireless network. In the illustrated embodiment, the vehicle operator's cell phone has been paired to the BCM 40 in a manner known in the art.

As further illustrated in FIG. 3, the lamp unit 16 also includes an indicator 42 for signaling when there is an incoming phone call on the cell phone of the vehicle operator or any other cell phone which is paired to the BCM 40. More specifically, the controller 36 communicates with the BCM 40 through the wireless communication component 38. Thus, when there is an incoming call on a cell phone paired to the BCM 40, the controller 36 receives an appropriate signal from the BCM 40 through the wireless communication component 38. In response, the controller 36 activates the indicator 42 to signal the existence of the incoming phone call. That indicator 42 may comprise a vibrator, an audio generator and/or a flashing light.

As further illustrated in FIGS. 3 and 4, the removable lamp unit 16 may also include a mounting element 44. More specifically, the mounting element 44 is carried on a rear face 26 of the removable lamp unit 16 so as to be hidden from view by the housing 12 when the removable lamp unit is held in the receiver 14 (note recess 48 for receiving the mounting element 44 in FIG. 3).

An emergency lighting system, generally designed by reference numeral 50 is illustrated in FIG. 4. That emergency lighting system 50 comprises a motor vehicle jack 52 including a jack handle 54. The jack handle 54 includes a cavity 56 for holding a hex wrench 58 pivotally secured to the jack handle 54 by a pivot 60. In use, the hex wrench 58 is pivoted on the pivot 60 from the stowed position illustrated in phantom line in FIG. 4 to the use position extending from the jack handle 54 and illustrated in full line.

Figure 5B:
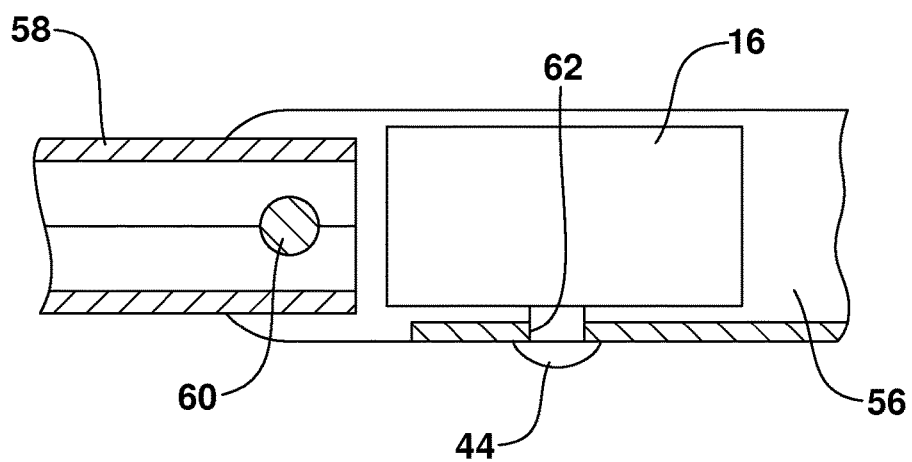

After removal from the receiver 14, the lamp unit 16 (shown schematically in FIG. 4) may be connected to a complementary mounting point or aperture 62 on the jack handle 54 by means of mounting element 44. In this way, the lamp unit 16 may be held in an orientation directing light from the lamps 30 onto a work area such as through the hex wrench 58 onto the jack screw 64 of the jack 52. See FIG. 5b and note the mounting element 44 in the form of a resilient lug that snaps into aperture 62 in handle 54. Advantageously, if at any time during the tire changing operation the user receives an incoming call on a cell phone paired to the BCM 40, the lamp unit 16 held on the jack handle 54 will provide an appropriate indication by means of the indicator 42 to alert the user of the incoming call even if the cell phone has been left inside the vehicle.

Figure 5D:
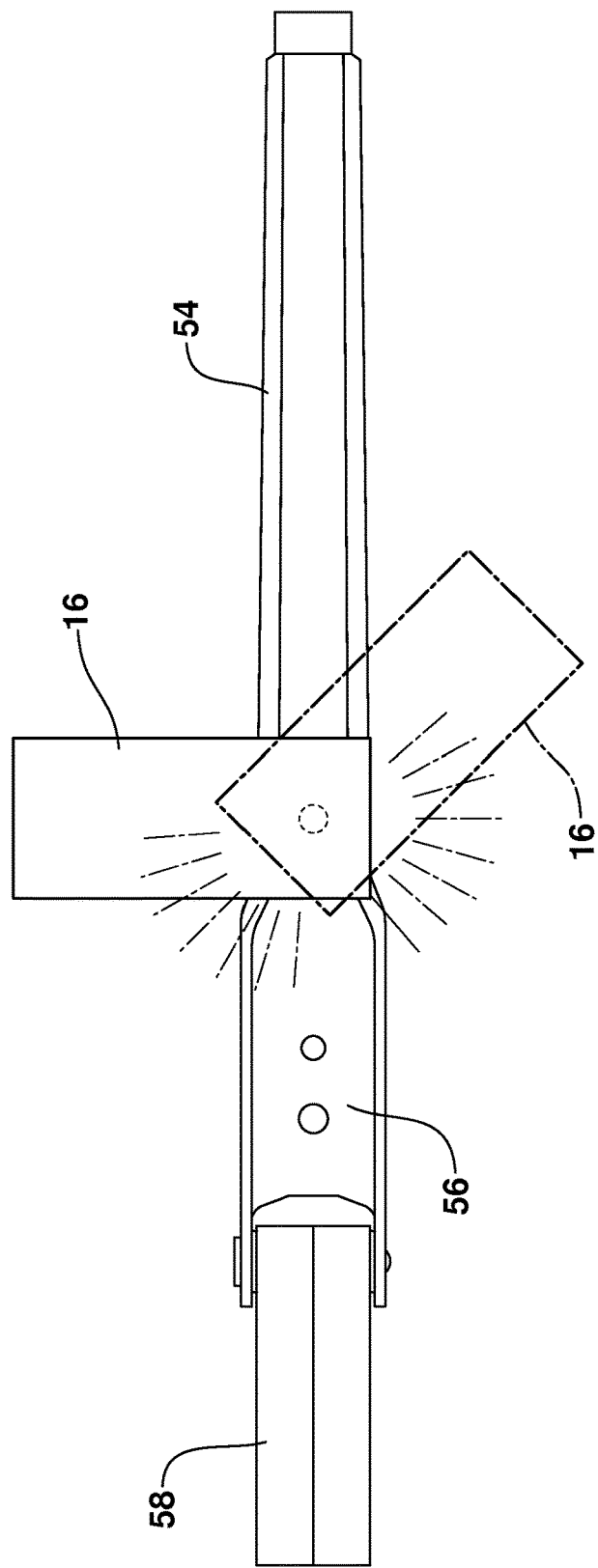
Figure 6:
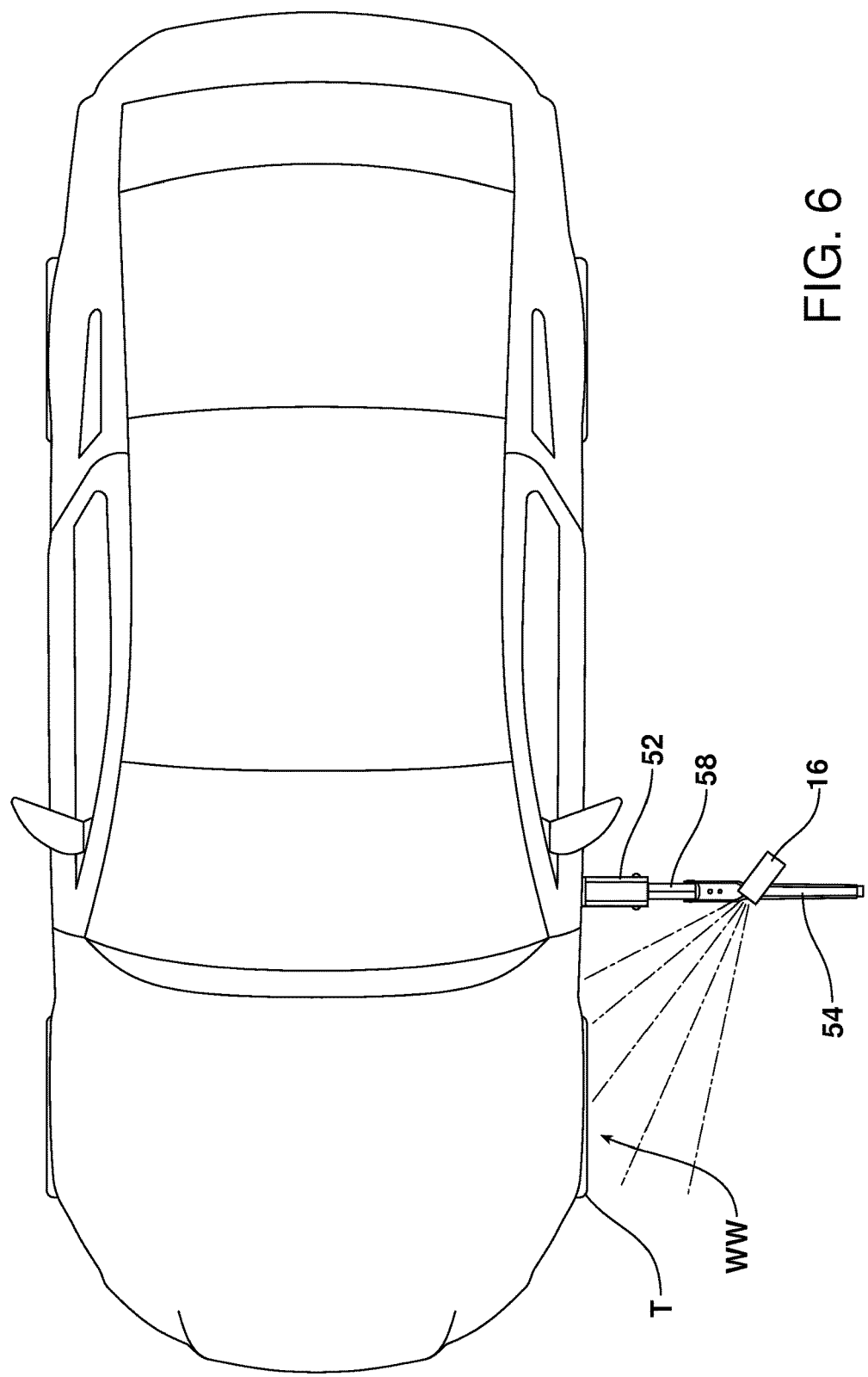
FIG. 6 shows the emergency lighting system of FIG. 4 with the light source on the jack handle oriented so as to illuminate the flat tire in the nearby fender well.

As illustrated in FIG. 5c, the lamp unit 16 may be secured to the wrench handle 54 at a second mounting point/aperture 66 provided along the handle if desired. FIG. 5d illustrates how the lamp unit 16 may be oriented at different angles with respect to the wrench handle 54 to selectively light a work area. FIG. 5e illustrates how the lamp unit 16 carried on the jack handle 54 may be used to illuminate the lug nuts L on a wheel W. Further, FIG. 6 illustrates how the lamp unit 16 held on the jack handle 54 connected to the jack screw 64 may be oriented to light a flat tire T in the wheel well WW of the motor vehicle.

The foregoing has been presented for purposes of illustration and description. It is not intended to be exhaustive or to limit the embodiments to the precise form disclosed. Obvious modifications and variations are possible in light of the above teachings. For example, the removable lamp unit 16 may include an SOS roadside assistance call button 68 connected through the controller 36 and wireless communication component 38 to the BCM 40. When such a button 68 is pressed, the BCM 40 may then complete a connection to a roadside assistance service in a manner known in the art.

Figure 7:
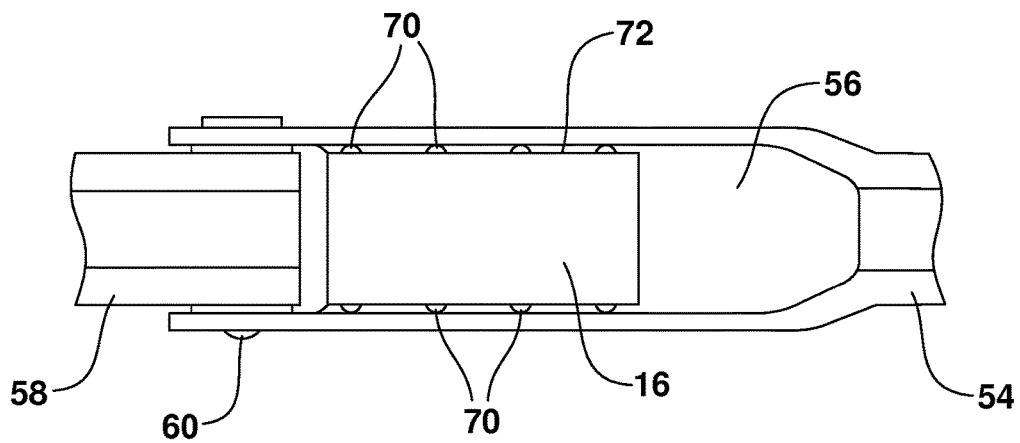
FIG. 7 illustrates another alternative embodiment of the emergency lighting system and light source.

As illustrated in FIG. 7, the mounting element 44 may comprise flexible ribs 70 on the housing 72 of the lamp unit 16 which serve to provide a friction fit in the jack handle cavity 56.

Still further, although the drawing figures depict a separate on switch 21 and off switch 34 for lighting and extinguishing the lamps 30 on the lamp unit 16, it should be appreciated that any other means of lighting or extinguishing the lamps 30 may be employed, such as a toggle or a single button (not shown). All such modifications and variations are within the scope of the appended claims when interpreted in accordance with the breadth to which they are fairly, legally and equitably entitled.

What is claimed:

1. A dome light assembly for a motor vehicle, comprising:
   a housing including a receiver;
   a removable lamp unit releasably held in said receiver;
   a controller with a wireless communicator component carried on said removable lamp unit to communicate wirelessly with a body control module of the motor vehicle when said removable lamp unit is removed from said housing; and
   an indicator for signaling an incoming phone call carried on said removable lamp unit.

2. The dome light assembly of claim 1, wherein said indicator is a vibrator.

3. The dome light assembly of claim 1, wherein said indicator is an audio generator.

4. The dome light assembly of claim 1, wherein said indicator is a flashing light.

5. The dome light assembly of claim 1, further including a mounting element carried on said removable lamp unit.

6. The dome light assembly of claim 1, further including an SOS roadside assistance call button in said removable lamp unit.

7. The dome light assembly of claim 1, further including a rechargeable power source carried on said removable lamp unit to power electrical components of said removable lamp unit when said removable lamp unit is removed from said housing.

8. The dome light assembly of claim 5, wherein said mounting element is carried on a rear face of said removable lamp unit so as to be hidden from view by said housing when said removable lamp unit is held in said receiver.

9. The dome light assembly of claim 7, wherein said housing includes a charging cradle for charging said rechargeable power source when said removable lamp unit is held in said receiver.

10. The dome light assembly of claim 9, wherein said housing includes a latch for securing said removable lamp unit in said receiver and a button for releasing said latch to remove said removable lamp unit from said receiver.

11. The dome light assembly of claim 10, wherein said indicator is a vibrator.

12. The dome light assembly of claim 10, wherein said indicator is an audio generator.

13. The dome light assembly of claim 10, wherein said indicator is a flashing light.

\* \* \* \* \*